US006264780B1

(12) United States Patent
Iwanaga et al.

(10) Patent No.: US 6,264,780 B1
(45) Date of Patent: *Jul. 24, 2001

(54) METHOD OF MANUFACTURING BEAD FILLER AND APPARATUS FOR FORMING FILLER PORTION

(75) Inventors: Noriyuki Iwanaga; Takashi Senbokuya, both of Tokyo (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,523

(22) Filed: Aug. 27, 1998

(30) Foreign Application Priority Data

Aug. 29, 1997 (JP) .................................... 9-234777

(51) Int. Cl.$^7$ ..................................... B29D 30/48
(52) U.S. Cl. ................. 156/136; 156/130.7; 156/201; 156/406.4
(58) Field of Search .................... 156/136, 130.7, 156/398, 135, 201, 422, 406.4; 264/177.16, 177.17, 175, 210.2, 259

(56) References Cited

U.S. PATENT DOCUMENTS 5,203,938 * 4/1993 Moody et al. ...................... 156/136

FOREIGN PATENT DOCUMENTS

| 28 03 460 A1 | 8/1979 | (DE) . |
| 31 08 142 A1 | 9/1982 | (DE) . |
| 39 40 235 A1 | 6/1991 | (DE) . |
| 0 340 147 A2 | 11/1989 | (EP) . |
| 0 493 968 A1 | 12/1991 | (EP) . |

OTHER PUBLICATIONS

"Patent Abstracts of Japan", Vol. 12, No. 424 (M–761), Nov. 10, 1988 & JP 63 159040 A (Sumitomo Rubber Ind Ltd), Jul. 1, 1988.

* cited by examiner

*Primary Examiner*—Geoffrey L. Knable
(74) *Attorney, Agent, or Firm*—Sughrue, Mion, Zinn, Macpeak & Seas, PLLC

(57) ABSTRACT

A method and an apparatus for manufacturing a bead filler which does not deteriorate the uniformity of a pneumatic tire are provided. The apparatus extrudes a rubber composition at a surface velocity $V_1$ in a top portion 28 and at a surface velocity $V_2$ in a base portion 26, while forming the rubber composition in the shape of a filler portion 24 in a forming portion 40 by a truncated cone shaped extruding roller 38. The filler portion 24 formed in a curved shape similar to a shape of a side portion of a tire is formed due to the difference in velocity between the surface velocities $V_1$ and $V_2$. The filler portion 24 is successively joined to and wound around an annular bead core from a winding start end, and is disposed in the side portion of the tire after forming the bead filler.

8 Claims, 7 Drawing Sheets

F I G. 1
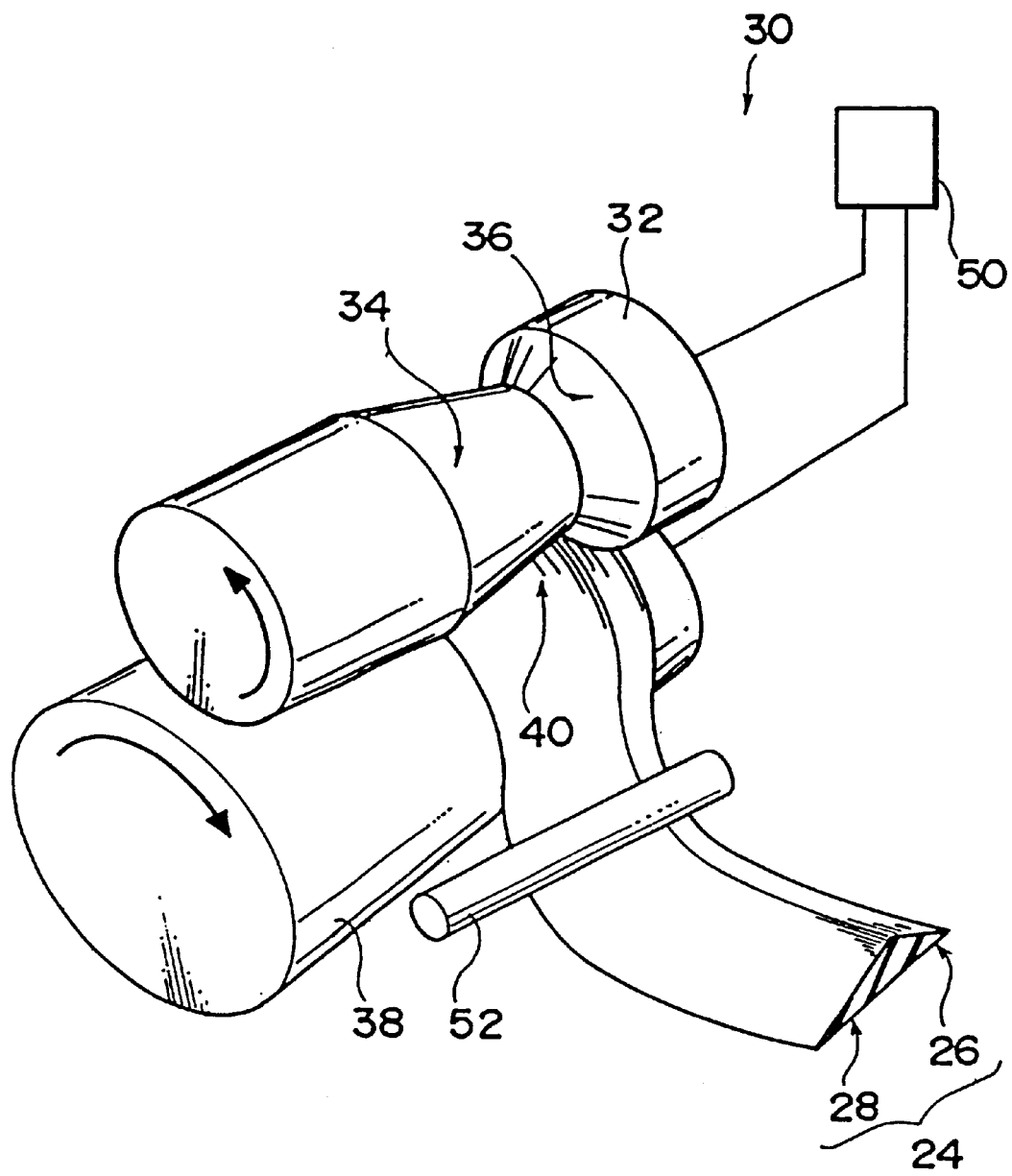

METHOD OF MANUFACTURING BEAD FILLER AND APPARATUS FOR FORMING FILLER PORTION

BACKGROUND OF THE INVENTION

1. Field of the Invention

The present invention relates to a method of manufacturing a bead filler and an apparatus for forming a filler portion, and more particularly to a method of manufacturing a bead filler constituted by a core portion and a filler portion and disposed in a curved side portion of a pneumatic tire and a filler portion forming apparatus for forming the filler portion.

2. Description of the Related Art

In a turned-up portion of a carcass ply disposed in the side portion of a pneumatic tire, a bead filler composed of a bead core and a filler portion is disposed. The bead core of the bead filler is formed in a circular ring shape by twisting a plurality of cords into one. On the other hand, the filler portion is made from a rubber composition having a predetermined length, and is formed by linearly extruding the rubber composition in a substantially triangular cross sectional shape having a thick base portion and a thin top poriton. The filler portion having a substantially triangular cross sectional shape is disposed in such a manner that one side of the triangle is brought into contact with the carcass ply main body portion 12A, one side is brought into contact with a bead core 22 and one side is brought into contact with a carcass ply turned-up portion 12B, as shown in FIG. 2.

In a process of manufacturing a tire, as shown in FIG. 7, a filler portion 82 extruded to a predetermined length is wound around a periphery of a bead core 84 having a circular ring shape. At this time, since the filler portion 82 is in a linearly extruded belt shape, it is wound substantially in a perpendicular state along an axial direction of the ring-like bead core 84 such that a top portion of the filler portion 82 is disposed in a perpendicular state to a radical direction of the bead core 84. When the winding start end is first mounted to the bead core 84 and the filler portion 82 is wound around once in a manner that a base portion of the filler portion 82 is disposed to contact with a peripheral portion of the bead core 84, the winding finish end overlaps and presses onto the winding start end. Accordingly, the winding start end and the winding finish end are joined, and a bead filler 80 integrally constructed by the filler portion 82 and the bead core 84 is formed.

As shown in FIGS. 7A and 7B, in the constructed bead filler 80, in which the filler portion 82 is disposed along an axial direction of the bead core 84, the filler portion 82 is pulled by the top portion thereof in the direction shown by the arrow M and is formed in a shape similar to the shape of the side portion of the pneumatic tire. Next, the bead filler 80, formed in the shape similar to the shape of the side portion of the pneumatic tire, is mounted on the carcass ply placed on a forming drum and disposed in the side portion of the pneumatic tire by turning up the turned-up portion 12B of the carcass ply around the bead filler 80.

In this case, when the top portion of the filler portion 82 is pulled to resemble the shape of the side portion of the pneumatic tire, the rubber composition is stretched out at the top portion of the filler portion 82 so that the diametrical size is greatly increased. At this time, since the base portion of the filler portion 82 is joined to the bead core 84, the diametrical size of the base portion of the filler portion 82 is only slightly changed. Accordingly, a large difference in diameter is generated between the base portion and the top portion of the filler portion 82.

Due to this difference in diameter, the amount of the opening is anticipated in advance and the rubber composition is excessively overlapped at that portion so that the joined portion does not open up at the top portion of the filler portion 82. Accordingly, even if the joined portion is stretched when the diametrical size has increased greatly by pulling up the filler portion 82, the winding start end and the winding finish end of the filler portion 82 are not separated from each other, so that a bead filler 80 formed in a shape similar to the shape of the side portion of the pneumatic tire can be obtained.

However, when the anticipated amount of opening is great, the overlapped amount becomes great. Accordingly, there are cases where a great difference in thickness is generated between the overlapped portion and the portion not overlapped. Further, the front end of the bead filler 80 is stretched by the anticipated amount so as to be the original thickness, however, the base portion which is overlapped by the same amount as the top portion is less stretched than the top portion. Accordingly, there are cases where the thickness of the filler portion 82 is uneven in the overlapped portion. As mentioned above, when unevenness is generated in the filler portion 82 along the circumferential direction of the side portion of the pneumatic tire, the unevenness becomes an unevenness along the circumferential direction of the side portion of the pneumatic tire, so that the uniformity of the pneumatic tire is deteriorated.

SUMMARY OF THE INVENTION

The present invention was made by taking the facts mentioned above into consideration. An object of the present invention is to provide a method of manufacturing a bead filler which can easily manufacture a bead filler not deteriorating the uniformity of a pneumatic tire, and a filler portion forming apparatus which can form the filler portion of this kind.

In a first aspect of the present invention, there is provided i) a method of manufacturing a bead filler comprising an annular core portion and a filler portion formed by extruding a rubber composition in a specific cross sectional shape and disposed in a curved side portion along the circumferential direction of the side portion of a pneumatic tire, wherein the filler portion is formed by extruding the rubber composition in a curved shape corresponding to the shape of the side portion of the pneumatic tire.

According to the first aspect of the present invention, since the filler portion is formed by extruding the rubber composition in a curved shape corresponding to the shape of the side portion of the pneumatic tire, a bead filler can be constructed which is integrally formed with the bead portion and already corresponds to the shape of the side portion of the pneumatic tire. Accordingly, a great change in the shape such as an expansion of the diameter by pulling the top portion of the filler portion is not required after constructing the bead filler, so that the time and labor hitherto required for the pulling process and the various process accompanying this process can be removed. Further, since it is not necessary to pull the top portion of the filler portion, the thickness and width of the overlapping portion between the winding start end and the winding finish end of the filler portion can be reduced. Accordingly, unevenness of the thickness of the filler portion along the circumferential direction of the side portion of the pneumatic tire is reduced, and the uniformity of a produced tire not thereby deteriorated. Therefore, a bead filler can be easily manufactured without deteriorating the uniformity of the pneumatic tire.

In this case, the description of the curved shape corresponding to the shape of the side portion of the pneumatic tire indicates all curved shapes intentionally extruded in the shape of the side portion of the pneumatic tire. In other words, not only a curved shape perfectly matching the shape of the side portion of the pneumatic tire, but also a curved shape similar to the shape of the side portion are included in this term.

ii) In the item i) mentioned above, the filler portion extruded in the curved shape may be advantageously joined along the periphery of the annular core portion.

Since the filler portion extruded in the curved shape is joined with the annular core portion, an annular bead filler corresponding to the shape of the side portion of the pneumatic tire can be obtained.

iii) In the item i) or ii) mentioned above, the extruded filler portion may advantageously have a radius of curvature of 190 to 400 mm at a center portion in the extrusion width direction.

This kind of filler portion can optimize the thickness of the joined portion between the winding start end and the winding finish end at the time of joining the curved filler portion to the annular core portion, and can make the thickness of the filler portion substantially uniform through the whole peripheral direction of a pneumatic tire.

iv) In any one of items i) to iii) mentioned above, the extruded filler portion may advantageously have a cross sectional shape which is thick in the portion close to a center of curvature of the curve of the filler portion in the area of the joint with the core portion and becomes thinner the further from the center of curvature.

Since the filler portion is extruded in a substantially triangular cross sectional shape which is thick at the center of curvature end and becomes thinner the further from the center of curvature, the core portion is reliably supported by the thick portion when the filler portion is joined to the core portion and is disposed as it is in the side portion of the pneumatic tire. Further, since the thickness of the filler portion becomes thinner in proportion to its closeness to the top portion, the rigidity of the side portion of the pneumatic tire can be continuously changed along the perpendicular direction to the axis of the tire.

v) In any one of items i) to iii), the above-mentioned filler portion may be advantageously extruded by using a roller having a different surface velocity at both ends in the extrusion width direction of the filler portion.

Since a roller having a surface velocity which continuously changes between both ends in the extrusion width direction is used at the time of extruding the filler portion, the amount of the rubber composition extruded is continuously changed along the extrusion width direction corresponding to the surface velocity by rotating the roller. The curved filler portion can be easily obtained due to the difference in the amount extruded.

vi) The roller used here may advantageously be structured such that the ratio of the surface velocities of both ends in the extrusion width direction of the filler portion is from 1.0:3.0 to 1.0:10.0, and both ends in the extrusion width direction of the filler portion are extruded by the roller.

A filler portion having a predetermined radius of curvature can be easily obtained by rotating the roller in accordance with this type of difference in the surface velocity. In the filler portion obtained here, the bonding accuracy at the overlapping portion of the filler portion can be further improved at a time of joining and winding onto the core portion.

vii) In any one of items i) to iii), the above-mentioned filler portion may advantageously have an extrusion width of at least 65 mm.

In a filler portion of this kind the top portion can be made to extend to near the tread portion when it is disposed in the side portion of the pneumatic tire. Accordingly, differences in the rigidity of the side portion of the tire along the perpendicular direction to the axis of the tire can be further reduced and uniformity can be further improved.

In a second aspect of the present invention, there is provided viii) a filler portion forming apparatus for forming a filler portion constituting a bead filler, which is disposed in a curved side portion along the circumferential direction of the side portion of a pneumatic tire and joined to an annular core portion, comprising forming means having a forming surface corresponding to a cross sectional shape of the filler portion, a roller opposing to the forming surface of the forming means and constituting the forming portion between the roller and the forming surface, and drive means for rotating the roller, wherein the diameter of the roller at each end in the width direction of the forming portion of the roller is different to the diameter at the opposite end, the rubber composition is continuously passed through by a rotation of the roller, and the filler portion is formed such that a cross sectional shape thereof corresponds to a shape of the forming portion, and a shape in an extruding direction thereof becomes a curved shape corresponding to a shape of the side portion of the pneumatic tire.

The rubber composition is fed out while being formed in a predetermined cross sectional shape by the forming portion constituted by the roller and the forming surface. Further, the shape in the extruding direction of the extruded rubber composition becomes the curved shape corresponding to the shape of the side portion of the pneumatic tire due to the difference in the surface velocity of the roller. Accordingly, the present invention can easily manufacture the filler portion corresponding to the shape of the side portion of the pneumatic tire. Further, the shape of the obtained filler portion can be changed by a minimum amount, and the overlapping portion can be reduced at the time of mounting the filler portion to the annular core portion.

Accordingly, the filler portion in an extruding state can be used as it is by reducing the width and thickness of the overlapping portion, so that the bead filler can be easily manufactured without deteriorating a uniformity of the produced tire.

ix) In the item viii) mentioned above, the ratio of the diameters of both ends of the roller may be advantageously set to be from 1.0:3.0 to 1.0:10.0.

The surface velocities of both ends in the widthwise direction of the roller opposing to the forming portion changes on the basis of the diameter. Accordingly, the width and the thickness of the joint portion between the winding start end and the winding finish end of the filler portion joined to the core portion can be optimized. Accordingly, in the case of disposing the obtained filler portion in the side portion of the pneumatic tire, a filler portion having even less unevenness in the peripheral direction can be easily obtained.

As mentioned above, in accordance with the method of manufacturing the bead filler of the present invention, since the filler portion is formed by extruding the rubber composition in the curved shape corresponding to the shape of the side portion of the pneumatic tire, the bead filler can be easily obtained without deteriorating the uniformity of the pneumatic tire.

Further, in accordance with the filler portion forming apparatus of the present invention, the rubber composition extruded by the extruding means is fed out in the curved shape corresponding to the shape of the side portion of the pneumatic tire in the extruding direction while being formed in the predetermined cross sectional shape by the roller and the forming portion, it is not necessary to change the shape of the obtained filler portion, so that the bead filler can be easily obtained without deteriorating a uniformity of the produced tire.

BRIEF DESCRIPTION OF THE DRAWINGS

FIG. 1 is a schematically perspective view of a forming apparatus in accordance with an embodiment of the present invention.

DESCRIPTION OF THE PREFERRED EMBODIMENTS

The present embodiments will now be explained in detail with reference to the drawings.

A forming apparatus 30 in accordance with an embodiment of the present invention is shown in FIG. 1. The forming apparatus 30 forms the filler portion 24 of a bead filler 20 provided in a pneumatic tire 10 (the tire size is 205/65R15, hereinafter, simply referred to as a tire).

Figure 2:
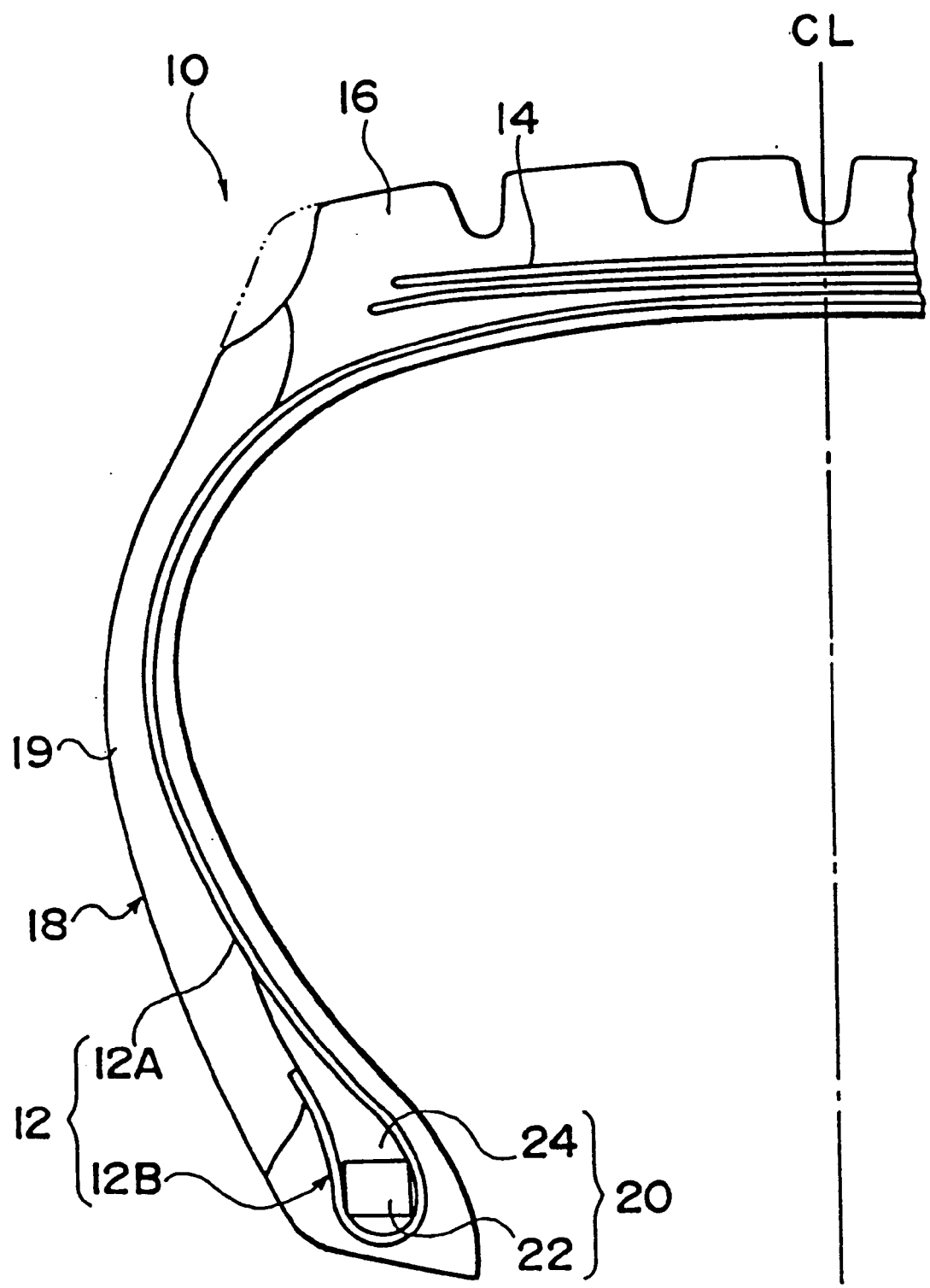
FIG. 2 is a cross sectional view along an axial line of a tire in accordance with an embodiment of the present invention.

FIG. 2 shows a part of the tire 10 provided with the bead filler 20 including the filler portion 24 formed by the forming apparatus 30. In the tire 10, a carcass ply 12 formed in a toroidal shape is provided, and the bead filler 20 is disposed between a main body portion 12A and a turned-up portion 12B of the carcass ply 12. In a crown portion of the tire 10, a belt 14 comprising a plurality of layers is disposed outside the carcass ply 12 in a radial direction, and a tread 16 is disposed outside the belt 14 in the radial direction.

The bead filler 20 is composed of a bead core 22 composed of a plurality of intertwisted steel cords and a filler portion 24 formed from a single rubber body or a composite rubber material such as a fiber reinforcing rubber and the like. The turned-up portion 12B of the carcass ply 12 is wound around the filler portion 24 encircling the bead core 22 turned-up.

The filler portion 24 of the bead filler 20 is formed in a substantially triangular cross sectional shape, and is composed of a base portion 26 corresponding to the bottom side of the triangle and a top portion 28 corresponding to the vertex of the triangle (refer to FIG. 1). The filler portion 24 is joined to the bead core 22 at the base portion 26, and the top portion 28 is disposed facing towards the tread 16 of the tire 10.

An outer side in the tire axial direction of the carcass ply 12 is formed as the side portion 18, in which a side rubber 19 extending to the bead core 22 of the bead filler 20 from an end portion of the tread 16 is disposed. The side rubber 18 covers a surface of the bead filler 20 from the bead core 22 to the end portion of the tread 16.

The side portion 18 of the tire 10 is maintained in a curved shape by the carcass ply 12 which is formed in a toroidal shape. Accordingly, the side rubber 18 and the bead filler 20 are curved in accordance with the shape of the carcass ply 12 so as to cover the surface of the carcass ply 12.

Figure 4A:
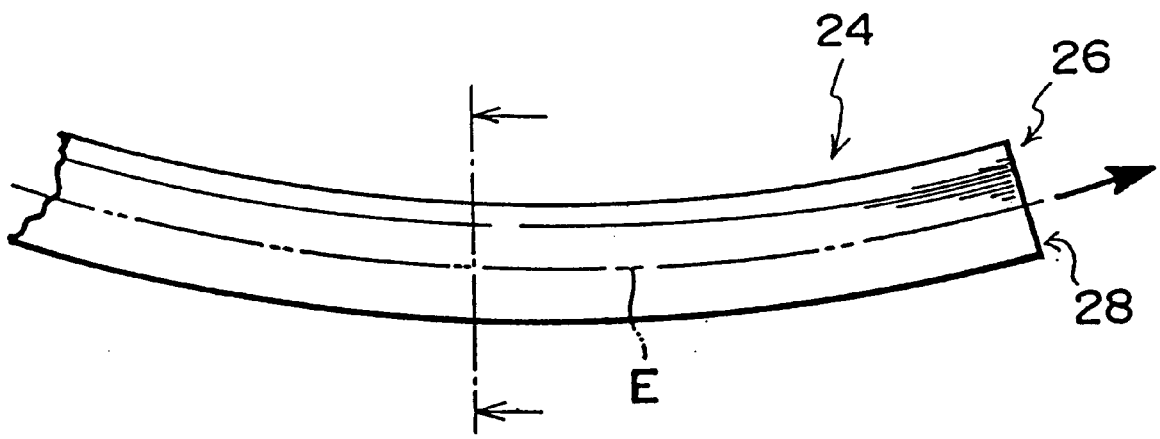
FIG. 4A is a plan view of a filler portion formed by a forming apparatus.
Figure 4B:
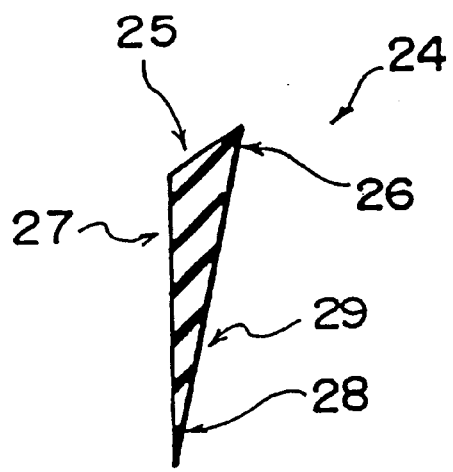
FIG. 4B is a cross sectional view of FIG. 4A.

As mentioned above, the filler portion 24 is formed in a substantially triangular cross sectional shape comprising a bottom side 25, and sides 27 and 29, as shown in FIG. 4B. The filler portion 24 is disposed in such a manner that the bottom side 25 is brought into contact with the bead core 22, the side 27 is brought into contact with the carcass ply turned-up portion 12B and the side 29 is brought into contact with the carcass ply main body 12A, as shown in FIG. 2.

The filler portion 24 constituting the bead filler 20 of the tire 10 of this kind is formed by a forming apparatus 30 shown in FIG. 1.

Figure 3:
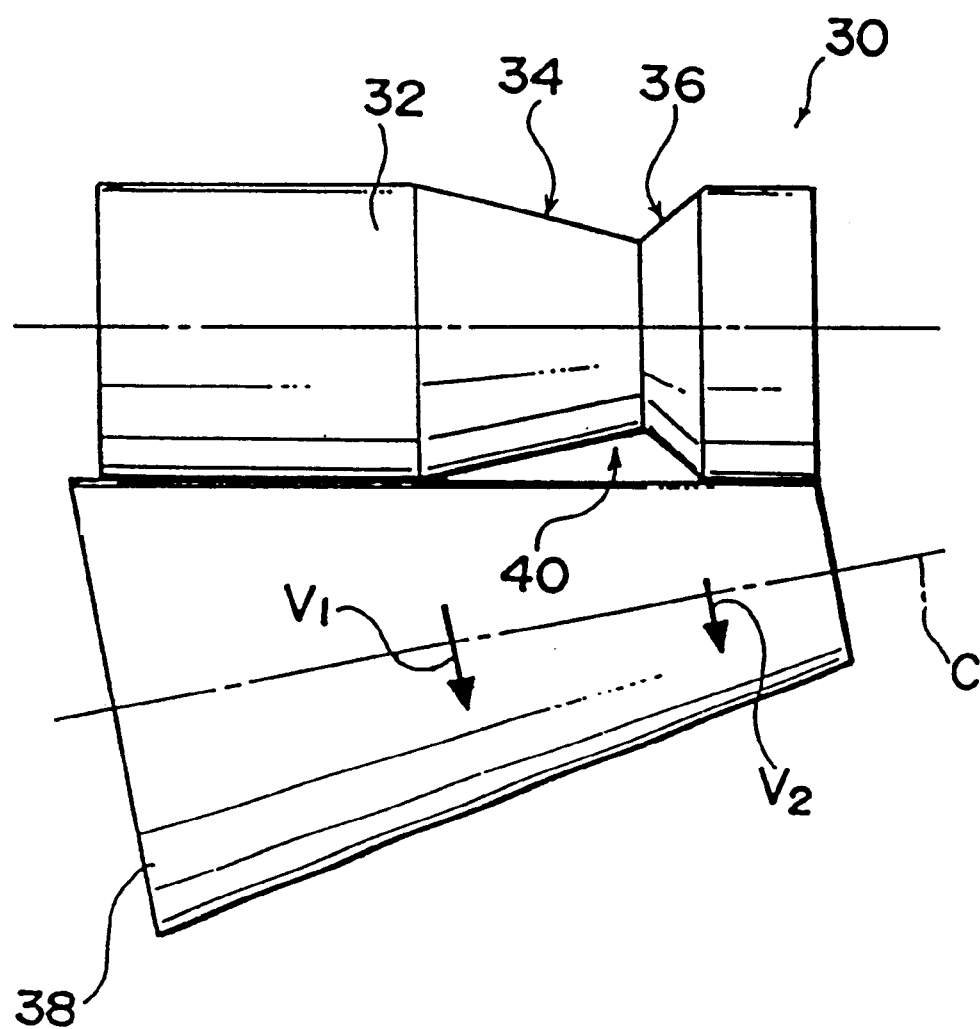
FIG. 3 is a side elevational view of a forming apparatus in accordance with an embodiment of the present invention.

AS shown in FIGS. 1 and 3, the forming apparatus 30 is composed of an extruding roller 38 for forming the rubber composition constituting the filler portion 24 and extruding the rubber composition in the curved shape of the filler portion 24, and a forming roller 32.

The forming roller 32 is formed in a cylindrical shape constricted in the central portion thereof. The constricted portion of the forming roller 32 is formed by continuously reducing the diameter at different ratios from both ends in the direction of the rotational axis. Accordingly, the diameter of the forming roller 32 is reduced at different ratios, and has two peripheral surfaces 34 and 36 having different lengths in the rotational axis direction.

On the other hand, the extruding roller 38 is formed in a substantially truncated cone shape longer than the forming roller 32, and the diameter around the rotational axis C continuously changes along the direction of the rotational axis C. The size of the smallest diameter around the rotational axis C of the extruding roller 38 is the same as the diametrical size of the forming roller 32.

As shown in FIG. 3, the rotational axis C of the extruding roller 38 is inclined with respect to the rotational axis of the forming roller 32, and the peripheral surfaces of the extruding roller 38 and the forming roller 32 are adjacent to and facing each other. In the constricted portion of the forming roller 32, a triangular gap is formed between the extruding roller 38 and the forming roller 32. The gap corresponds to a forming portion 40 for forming the rubber composition in a shape of the filler portion 24.

The cross sectional shape along the rotational axis of the forming roller 32 in the forming portion to is formed in a triangular shape substantially coinciding with the cross sectional shape of the filler portion 24, the peripheral surface of the forming roller 32 forms the bottom side of the filler portion 24 (the portion in contact with the peripheral surface 36, corresponding to reference numeral 25 in FIG. 4B) and one of the long sides (the portion in contact with the peripheral surface 34, corresponding to reference numeral 27 in FIG. 4B) of the filler portion 24, and the peripheral surface of the extruding roller 38 forms the other of the long sides (corresponding to reference numeral 29 in FIG. 4B) of the filler portion 24. Accordingly, the diameter contraction ratio and the shape of the diameter contracted portion of the forming roller 32, constituting a part of the forming portion 40, are determined in correspondence to the cross sectional shape of the filler portion 24.

Further, the forming portion 40 disposes the portion forming the base portion 26 (the side nearest the reference numeral 25 in FIG. 4B) of the filler portion 24 at the end of the extruding roller 38 having the smaller diameter, and disposes the portion forming the top portion 28 (the side nearest the reference numeral 27 end in FIG. 4B) of the filler portion 24 at the end of the extruding roller 38 having the larger diameter. Accordingly, the surface velocity $V_2$ of the extruding roller 38 at the end of the forming portion 40 corresponding to the base portion 26 of the filler portion 24 is set to be lower than the surface velocity $V_1$ of the extruding roller 38 at the end portion of the forming portion 40 corresponding to the top portion 28 of the filler portion 24 in accordance with the diameter of the extruding roller 38.

It is preferable that the ratio $V_2$; $V_1$ of the surface velocities is set to be from 1.0:3.0 to 1.0:10.0. Inside this range, the shape of the obtained filler portion 24 becomes similar to the shape of the side portion 18 of the tire 10, resulting in there being no need to greatly change the shape after forming, or causing the width and thickness of the overlapped portion to be even, and is thus preferable. In order to make the shape of the filler portion 24 even more similar to the shape of the side portion 18 of the tire 10 and to optimize the width and thickness of the overlapped portion, it is preferable that the ratio of the surface velocities $V_2$: $V_1$ is set to be from 1.0:5.0 to 1.0:7.0. In this case, the ratio of the velocities corresponds to the diameter of the extruding roller 38 in the forming portion 40.

A feeding-out portion (not shown) is disposed upstream at the forming roller 32 and the extruding roller 38 in FIG. 1. The feeding-out portion feeds out the rubber composition forming the filler portion 24 toward the forming roller 32 and the extruding roller 38.

The rotational axis C of the extruding roller 38 is connected to a drive portion 50 with the motor at the side at which the diametrical size is smaller. Further the drive portion 50 is connected to the rotational axis of the forming roller 32. The extruding roller 38 and the forming roller 32 are rotated at the same rotating speed per unit time by the same motor.

Further, a guiding roller 52 is disposed below the extruding roller 38. The guiding roller 52 guides the filler portion 24 formed and extruded from the extruding roller 38 to the downstream side the extruding roller 38.

A joining apparatus (not shown) for joining the filler portion 24 to the bead core 22 is disposed downstream from the forming apparatus for the filler portion 24. Rotating means such as a drum for fitting and rotating the bead core 22 is provided in the joining apparatus. The drum has a diameter capable of winding the bead core 22 therearound, and is connected to a motor for rotating the drum (in a single direction).

A joining apparatus for joining the filler portion 24 to the bead core 22 and an adhering apparatus for joining the winding finish end to the winding start end of the filler portion 24 are disposed at a position on the periphery of the bead core 22 wound around the drum. The adhering apparatus performs an adhesion function by heating the filler portion 24.

As mentioned above, the forming apparatus 30 forms the forming portion 40 in the shape of the filler portion 24 by means of the extruding roller 38 having a truncated cone shape. At this time, the rubber composition disposed at the end portion of the top portion 28 is extruded at a surface velocity $V_1$, and the rubber composition disposed at the end portion of the base portion 26 is extruded at a surface velocity $V_2$. The filler portion 24 having a curved shape similar to the shape of the side portion 18 of the tire 10 is formed due to the difference in speed between the surface velocity $V_1$ and the surface velocity $V_2$. The filler portion 24 is successively joined to the annular bead core 22 from the winding start end to be wound around the bead core 22, and is disposed in the side portion 18 of the tire 10 in the tire-forming step after the end portions of the filler portion 24 are adhered and joined together thus forming the bead filler 20.

Next, an operation in accordance with the embodiment will be explained.

In the forming apparatus 30, the extruding roller 38 is rotated by the driving action of the drive portion 50. When the extruding roller 38 rotates and the peripheral surface of the extruding roller 38 moves, the forming roller 32 disposed in such a manner as to be in contact with the peripheral surface of the extruding roller 38 also rotates.

While the extruding roller 38 and the forming roller 32 are rotating, when the rubber composition is fed out from the feeding-out portion toward the forming portion 40 disposed between the extruding roller 38 and the forming roller 32, the rubber composition is formed in a triangular cross sectional shape by the peripheral surfaces of the extruding roller 38 and the forming roller 32 in the forming portion 40 (refer to FIG. 4B). The rubber composition formed in the forming portion 40 is extruded from the extruding roller 38 by the rotation of the extruding roller 38.

In the extruding roller 38 extruding the rubber composition, as shown in FIG. 3, the diameter around the rotational axis C continuously changes along the C axis direction in the forming portion 40. The surface velocity continuously changes along the C axis direction together with the change of the diametrical size, and the speed at which the rubber composition is extruded is set so that the surface velocity $V_1$ at the end close to the top portion 28 is faster than the surface velocity $V_2$ of the end close to the base portion 26.

Due to the difference in the surface velocity, the amount of rubber composition extruded from both ends of the forming portion 40 per unit time is different, and thus a larger amount of the rubber composition is extruded at the end close to the top portion 28 as this end has the faster surface velocity. Further, the rubber composition disposed between the forming roller 32 having the same surface velocity in the axial direction and the extruding roller 38 having varying surface velocities in the axial direction, as it is extruded, becomes more further distorted the closer to the top portion 28 due to the difference in the surface velocities between the forming roller 32 and the extruding roller 38. Accordingly, as shown in FIG. 4A, the filler portion 24 is curved and extruded in a circular arc shape with the base portion 26 side which is extruded in a lesser amount forming the inner side. Accordingly, the extruded filler portion 24 is formed in the shape of a sector having the center portion in the radial direction thereof cut out therefrom. The outer peripheral portion formed in this shape corresponds to the top portion 28 side, and the inner peripheral portion corresponds to the base portion 26 side. The term "a curved filler portion" or "a substantially circular arc filler portion" herein may correspond to a filler portion formed in a shape mentioned above.

The filler portion 24 is next cut in a predetermined length set in accordance with the peripheral size of the tire 10, and is joined to the periphery of the bead core 22 previously formed in an annular shape.

Figure 5:
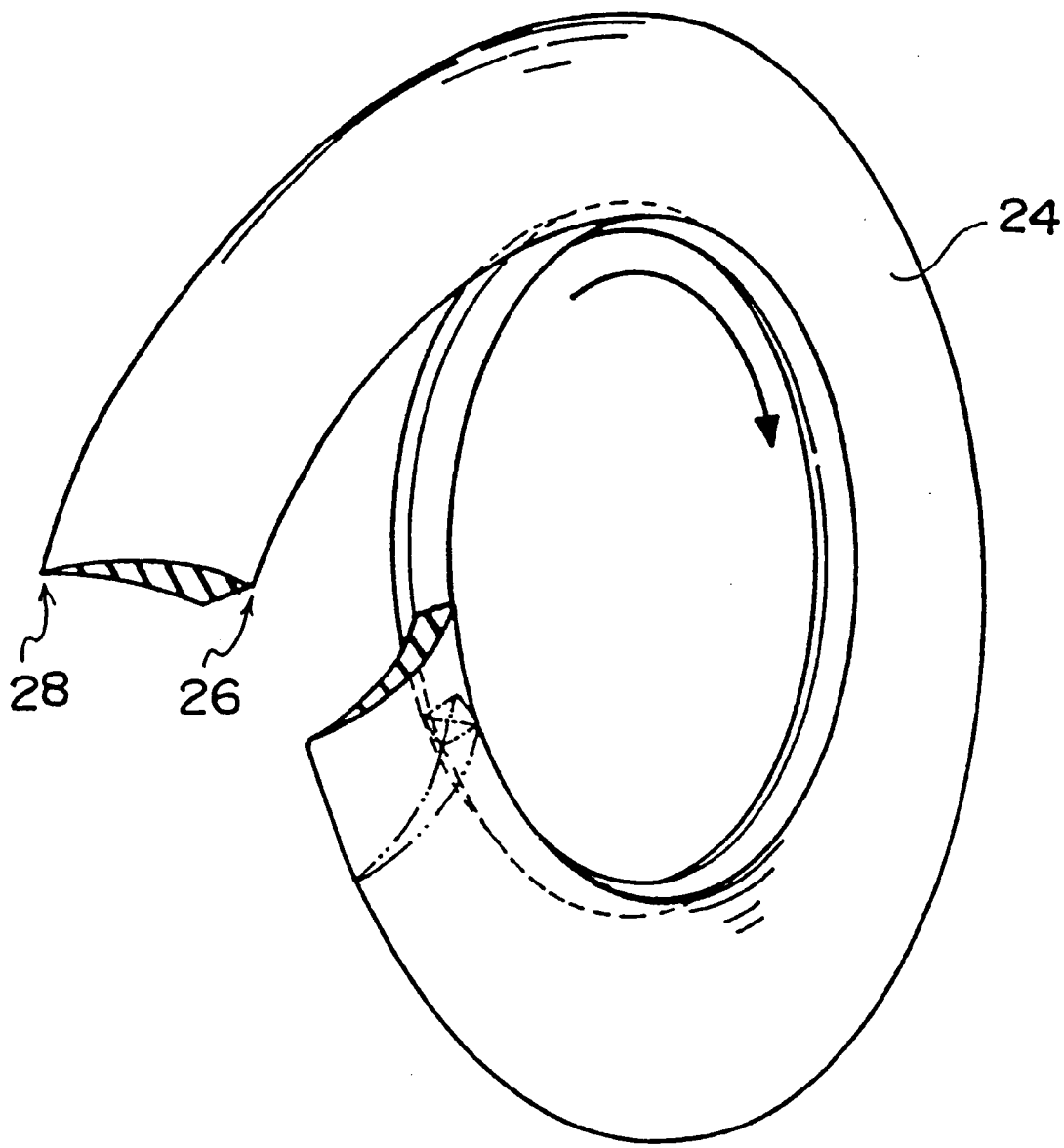
FIG. 5 is a schematic view showing a state in which a bead filler is constituted by a filler portion obtained by a forming apparatus in accordance with an embodiment of the present invention and a bead core.

As shown in FIG. 5, the winding start end of the filler portion 24 cut in a predetermined length is joined to a predetermined position of the annular bead core 22. When the winding start end is joined, the annular bead core 22 rotates in the direction of the arrow in FIG. 5, so that the filler portion 24 that is obtained is successively joined to the bead core 22.

Since the filler portion 24 is formed in advance in a shape curved in such a manner as to be similar to the shape of the side portion 18 of the tire 10, the formed bead filler 20 is formed in a shape similar to the disc formed by the bead core 22 disposed in the inner portion of the bead filler 20 as it is wound around the annular bead core 22.

When the filler portion 24 is mounted on the periphery of the bead core 22, the winding finish end of the filler portion 24 reaches the position where the winding start end of the filler portion 24 is mounted. The winding finish end of the filler portion 24 is overlapped, adhered and joined to the winding start end of the filler portion 24.

Here, since the filler portion 24 is previously formed in a curved shape similar to the shape of the side portion 18 of the tire 10, there is practically no necessity to modify the shape of the filler portion 24 once the bead filler 20 has been constructed by winding the filler portion 24 around the bead core 22 once and then joining.

Accordingly, it is not necessary to consider the amount opened up which is the consequence of changing the shape, so that the overlapping portion between the winding start end and the winding finish end of the filler portion 24 is formed in such a manner as to have a substantially the same width from the top portion 28 to the base portion 26 of the filler portion 24. Further, the thickness of the overlapping portion of the filler portion 24 can be set to be about 100 to 120% of the portion not overlapped by the adhesion. Particularly, it can be even thinner in the top portion 28. As a result, the precision of the joint between the winding start end and the winding finish end of the filler portion 24 can be improved. Further, a so-called butt joint, which is joined without overlapping the winding start end and the winding finish end can be achieved.

Further, the bead filler 20 obtained in this manner has little unevenness in the peripheral direction of the tire and has a radius of curvature of 190 to 400 mm at the center portion in the widthwise direction (the center line E in FIG. 4A), and preferably has a radius of curvature of 220 to 320 mm. In the tire 10 using this type of the bead filler 20, unevenness in the side portion 18 can be reduced, and the uniformity of the tire 10 can be improved. When the radius of curvature is inside the range, the thickness in the overlapping portion becomes uniform when the winding start end and the winding finish end are joined, and the evenness decreases, so that the joining precision is improved and is thus preferable.

Accordingly, since the unevenness along the peripheral direction of the filler portion 24 can be reduced, the uniformity of the tire 10 is not deteriorated when it is disposed in the side portion 18 of the tire 10. Further, it is not necessary to change the shape after joining the filler portion 24 to the bead core 22, making the rewinding and modifying of the filler portion 24 unnecessary, so that forming efficiency can be improved. Particularly, if the shape of the filler portion 24 completely coincides with the shape of the side portion 18 of the tire 10, the necessity of changing the shape can be completely removed. Accordingly, the bead filler 20 which does not deteriorate the uniformity of the tire 10 can be manufactured with good productivity.

Further, since it is not necessary to change the shape of the filler portion 24, the bead filler 20, having the filler portion 24 structured so that the thickness of the front end is particularly thin and the extrusion width is as wide as 65 mm or more, can be easily obtained. The thickness of the wide filler portion 24 is about 1.5 to 2 mm at the front end. Since the bead filler 20 provided with the wide filler portion 24 of this kind can be disposed with the top portion 28 close to the tread portion 16 at a time of being disposed in the side portion 18 of the tire 10, differences in the rigidity of the side portion 18 can be reduced. Conventionally, it has been difficult to join the bead core 22 to the filler portion 24 before forming the tire 10 so as to construct the bead filler 20, unlike with the normal bead filler 24, however, in accordance with the present invention, the bead filler 20 can be manufactured by the same manner as the normal bead filler.

The forming roller 32 and the extruding roller 38 are disposed adjacent to and facing each other. When they both rotate the rubber composition is extruded thereby forming the filler portion 24. In some cases, the rubber composition is extruded along the face of the extruding roller 38 outside the gap of the forming portion 40. If this happens, the filler portion 24 can be trimmed to the desired shape by a cutting means such as a cutter of laser or the like placed in the downstream direction from the extruding roller 38.

In accordance with the embodiment of the present invention, an extrusion of the filler portion 24 is performed by using the forming roller 32 rotating by the same amount as the extruding roller 38, however, the forming of the filler portion 24 is not limited to being performed by the rotatable forming roller 32.

Figure 6A:
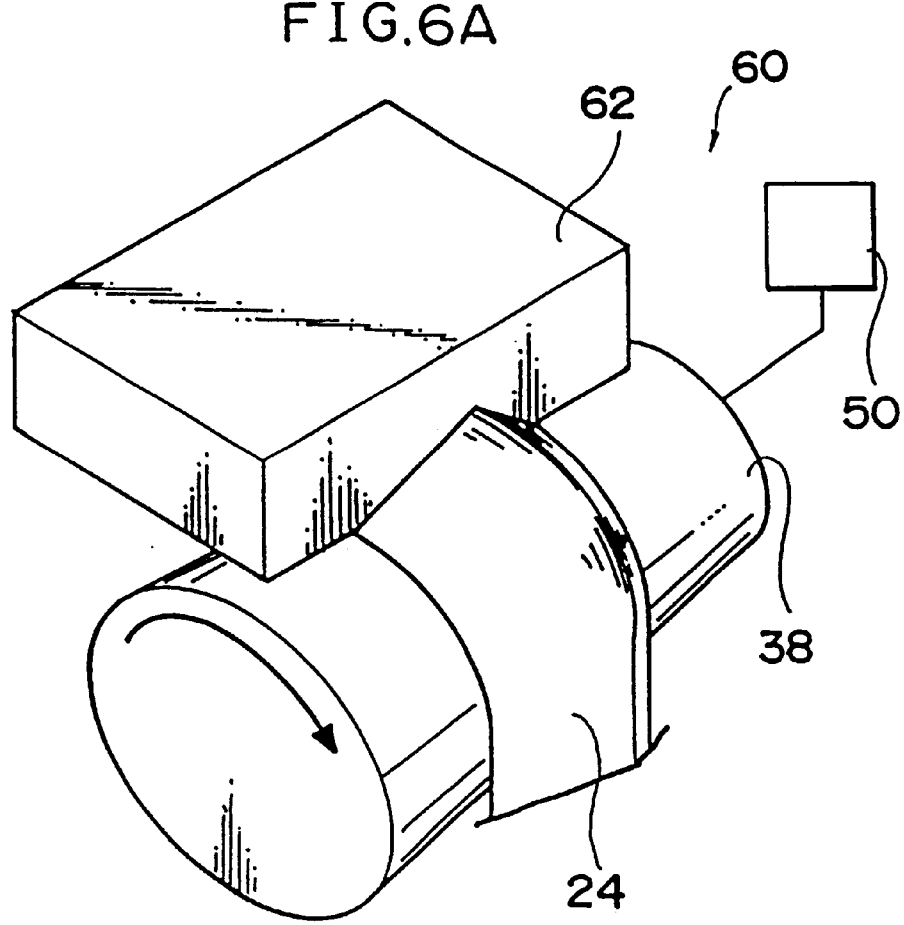
FIG. 6A is a schematically perspective view of a forming apparatus in accordance with another embodiment of the present invention.
Figure 6B:
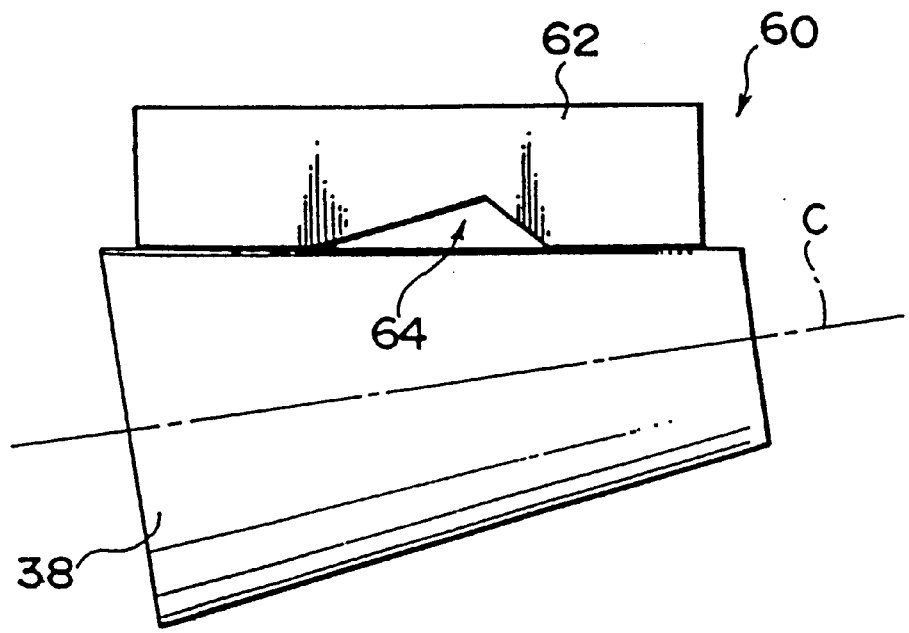
FIG. 6B is a side elevational view of FIG. 6A.
Figure 7A:
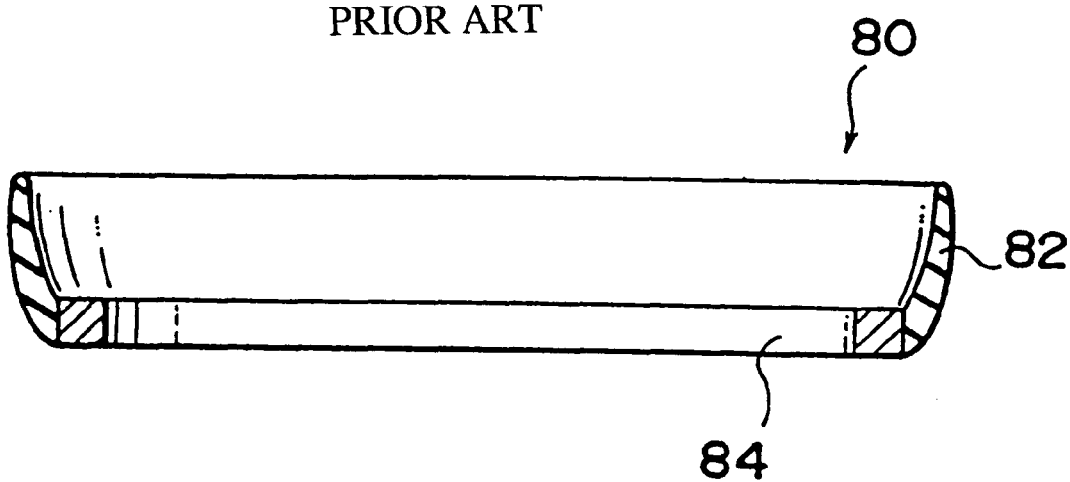
FIG. 7A is a schematically side elevational view of a bead filler obtained in a step of a conventional method of forming a bead filler.
Figure 7B:
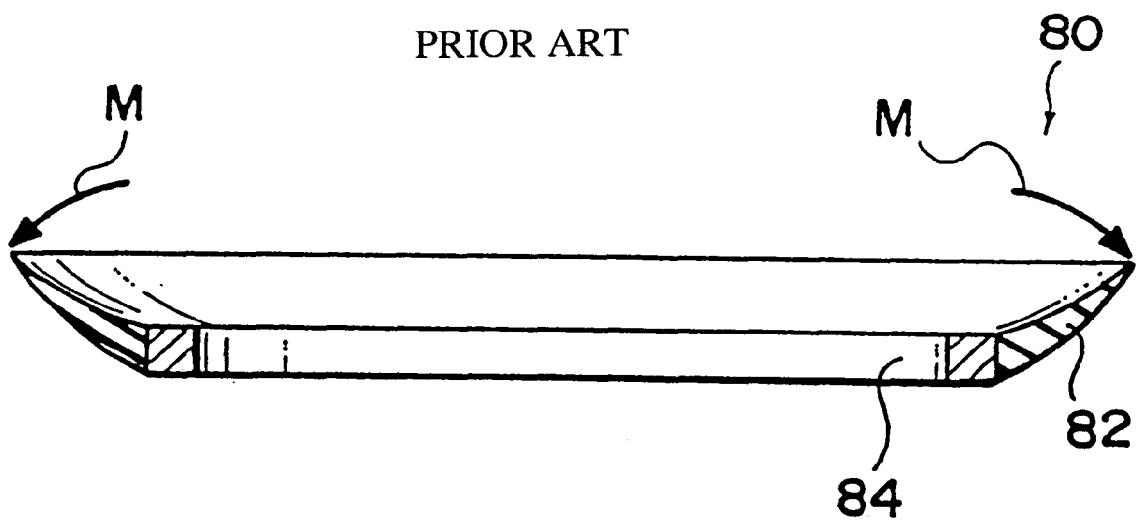
FIG. 7B is a schematically side elevational view of a bead filler obtained in the next step of FIG. 7A.

FIG. 6 shows a forming apparatus 60 which is another forming apparatus. The forming apparatus 60 is structured in the same manner as that of the forming apparatus 10 except that a die 62 is provided in place of the forming roller 32 (in FIG. 6, the guiding roller 52 is omitted from the illustration).

The forming apparatus 60 is provided with the die 62 above the extruding roller 38 having the same structure as that mentioned above. The die 62 is adjacent to and facing the peripheral surface of the extruding roller 38. The die 62 is a rectangular member and is provided with a forming portion 64 notched in a shape coinciding with the cross sectional shape of the filler portion 24 (refer to FIG. 6B).

Accordingly, when the rubber composition is fed out toward the forming portion 64 of the die 62 from the feeding-out portion, the rubber composition is formed in the shape of the filler portion 24 in the forming portion 64 of the die 62.

Even in the forming apparatus 60 provided with the die 62 of this kind, when the extruding roller 38 having a truncated cone shape rotates, the surface velocity of the extruding roller 38 continuously changes along the C axis direction between both end portions of the forming portion 64 in accordance with the diametrical size, in the same manner as mentioned above. Accordingly, the rubber composition is extruded in a shape defined by the die 62 and at a surface velocity in accordance with the diametrical size of the extruding roller 38. As a result, a filler portion 24 formed in a triangular cross sectional shape and curved in a substantially circular arc shape having the base portion 26 side as a center side in accordance with a surface velocity of the extruding roller 38 can be obtained.

Accordingly, since the filler portion 24 that is obtained is already similar to the shape of the side portion 18 when the filler portion 24 is disposed in the side portion 18 of the tire 10, it is not necessary to greatly change the shape and the unevenness is not generated in the side portion 18. As a result, a bead filler 20 can be easily obtained without deteriorating the uniformity of the tire 10.

In accordance with the embodiment of the present invention, the shape of the forming portion 64 is made a triangular shape formed by the peripheral surfaces 34 and 36 of the forming roller 32, the notch of the forming portion 64 and the peripheral surface of the extruding roller 38, however, the shape of the peripheral surfaces 34 and 36 of the forming roller 32 and the notch of the forming portion 64 can be optionally changed in accordance with the shape of the filler portion 24 of the desired bead filler 20.

In accordance with the embodiment of the present invention, the rubber composition is extruded in a curved shape and a filler portion 24 formed in a shape matching the side portion 18 is obtained, however, the curved filler portion 24 can be obtained by other means. For example, in place of the extruding roller 38, a disc-like rotating plate with its center disposed in the base portion 26 side of the filler portion 24 may be used. Also by this means, the rubber composition corresponding to the base portion 26 side of the filler portion 24 and the rubber composition corresponding to the front end portion 28 side can be extruded at different extruding speeds, so that the filler portion 24 curved in a circular arc shape can be obtained in the manner mentioned above. In this case, it is preferable that transfer direction changing means such as a roller, a hook or the like for changing the transfer direction of the extruded filler portion 24 from the rotating direction of the rotating plate to the downstream side of the extruding direction is disposed on the rotating plate, so that the obtained filler portion 24 is not again guided to the extruding roller 38.

What is claimed is:

1. A method of manufacturing a filler portion of the bead filler for a pneumatic tire comprising the steps of:

extruding a rubber composition into a specific cross-sectional shape and, simultaneously during the extrusion step curving it into a curved filler portion corresponding to a shape of the side portion of said pneumatic tire, and subsequently joining said curved filler portion with a bead core, wherein said filler portion is extruded and by using a pair rollers, said rollers forming an extrusion opening having a cross-sectional shape of said filler portion, and one of said rollers having different surface velocities at both ends in the extrusion width direction of said filler portion to curve the extrusion.

2. A method according to claim 1, wherein said filler portion extruded in the curved shape is joined along the periphery of said annular core portion.

3. A method according to claim 1, wherein said extruded filler portion has a radius of curvature of 190 to 400 mm at a center portion in the extrusion width direction.

4. A method according to claim 1, wherein said extruded filler portion has a cross sectional shape which is thick in a portion close to a center of curvature of the curved shape of said filler portion near a portion joined to said core portion and becomes thinner the further from the center of curvature.

5. A method according to claim 4, wherein a specific cross sectional shape of the filler portion is formed in a substantially triangular shape, with the sides of said triangle respectively corresponding to a bead core contact surface portion, a carcass body portion contact surface portion and a carcass turned-up portion contact surface portion, a center of curvature side of a curved shape of said portion corresponds to the bead core contact surface portion side, and a side furthest from the center of curvature of the curved shape of said filler portion corresponds to an angle formed by the carcass main body portion contact surface portion and the carcass turned-up portion contact surface portion.

6. A method according to claim 1, wherein both ends of said filler portion are extruded by said roller in the extrusion width direction with the ratio of the surface speeds of both ends of said roller being between 1.0:3.0 to 1.0:10.0.

7. A method according to claim 1, wherein said filler portion has an extrusion width of at least 65 mm.

8. A method of manufacturing a filler portion of the bead filler for a pneumatic tire comprising the steps of extruding a rubber composition into a specific cross-sectional shape and, simultaneously during the step of extruding curving it into a curved filler portion corresponding to a shape of the side portion of said pneumatic tire by using a pair of rollers having respective axes of rotation not parallel to each other, said rollers forming an extrusion opening having a cross-sectional shape of said filler portion, one of said rollers having different surface velocities at both ends in the extrusion width direction of said filler portion to curve the extrusion, and subsequently joining said curved filler portion with a bead core.

* * * * *